US009760264B2

(12) United States Patent
Lee et al.

(10) Patent No.: US 9,760,264 B2
(45) Date of Patent: Sep. 12, 2017

(54) METHOD AND ELECTRONIC DEVICE FOR SYNTHESIZING IMAGE

(71) Applicant: Samsung Electronics Co., Ltd., Suwon-si, Gyeonggi-do (KR)

(72) Inventors: Woo-Yong Lee, Hwaseong-si (KR); Min-Sheok Choi, Suwon-si (KR); Hye-Jin Kang, Suwon-si (KR); Jin-Hee Na, Seoul (KR); Young-Kwon Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 453 days.

(21) Appl. No.: 14/307,983

(22) Filed: Jun. 18, 2014

(65) Prior Publication Data

US 2015/0067554 A1    Mar. 5, 2015

(30) Foreign Application Priority Data

Sep. 2, 2013 (KR) .................. 10-2013-0105161

(51) Int. Cl.
| | |
|---|---|
| *G06F 3/0484* | (2013.01) |
| *G06T 11/00* | (2006.01) |
| *H04N 5/232* | (2006.01) |
| *H04N 5/262* | (2006.01) |

(52) U.S. Cl.
CPC .......... *G06F 3/04845* (2013.01); *G06T 11/00* (2013.01); *H04N 5/23293* (2013.01); *H04N 5/2624* (2013.01)

(58) Field of Classification Search
CPC combination set(s) only.
See application file for complete search history.

(56) References Cited

U.S. PATENT DOCUMENTS

| | | | |
|---|---|---|---|
| 9,088,712 B2* | 7/2015 | Son | |
| 9,207,859 B2* | 12/2015 | Woo | G06F 3/04815 |
| 9,467,648 B2* | 10/2016 | Kwon | H04N 7/142 |
| 2002/0145042 A1 | 10/2002 | Knowles et al. | |
| 2003/0019933 A1 | 1/2003 | Tsikos et al. | |
| 2003/0190089 A1* | 10/2003 | Katsuda | G06T 11/60 |
| | | | 382/284 |
| 2006/0048069 A1* | 3/2006 | Igeta | G06F 3/0486 |
| | | | 715/769 |
| 2008/0198175 A1* | 8/2008 | Sun | H04N 1/3876 |
| | | | 345/629 |
| 2010/0058182 A1* | 3/2010 | Jung | G06F 3/04883 |
| | | | 715/702 |
| 2010/0097339 A1* | 4/2010 | Ooba | G06F 3/0488 |
| | | | 345/173 |
| 2010/0157107 A1* | 6/2010 | Iijima | H04N 5/232 |
| | | | 348/240.99 |
| 2011/0025710 A1* | 2/2011 | Kennedy | G06T 7/0022 |
| | | | 345/629 |
| 2011/0231791 A1* | 9/2011 | Itahana | G06F 1/1645 |
| | | | 715/799 |
| 2011/0275415 A1* | 11/2011 | Lee | G06F 1/1686 |
| | | | 455/566 |

(Continued)

*Primary Examiner* — Hien Duong
(74) *Attorney, Agent, or Firm* — Jefferson IP Law, LLP

(57) ABSTRACT

A method and device for synthesizing an image are provided. The method includes obtaining a first image and a second image, determining at least one object in the first image, and synthesizing the second image with the determined at least one object.

23 Claims, 26 Drawing Sheets

(56) References Cited

U.S. PATENT DOCUMENTS

| | | | |
|---|---|---|---|
| 2012/0027294 A1* | 2/2012 | Krolczyk | G06T 11/60 382/165 |
| 2012/0038626 A1* | 2/2012 | Kim | H04N 13/007 345/419 |
| 2012/0224787 A1* | 9/2012 | Imai | H04N 5/2352 382/274 |
| 2012/0268552 A1* | 10/2012 | Choi | H04N 7/147 348/14.07 |
| 2012/0274808 A1* | 11/2012 | Chong | H04N 5/2258 348/234 |
| 2013/0033633 A1* | 2/2013 | Son | H04N 5/23293 348/333.02 |
| 2013/0038759 A1* | 2/2013 | Jo | H04N 5/2256 348/240.99 |
| 2013/0050519 A1* | 2/2013 | Lee | H04N 5/2355 348/222.1 |
| 2013/0117692 A1* | 5/2013 | Padmanabhan | H04N 21/4126 715/753 |
| 2013/0162853 A1* | 6/2013 | Kim | H04N 5/23293 348/220.1 |
| 2013/0162876 A1* | 6/2013 | Song | H04N 5/23229 348/333.01 |
| 2013/0188886 A1* | 7/2013 | Petrou | G06F 3/048 382/305 |
| 2013/0208167 A1* | 8/2013 | Chou | H04N 5/23219 348/333.11 |
| 2013/0229529 A1* | 9/2013 | Lablans | H04N 5/23238 348/169 |
| 2013/0235223 A1* | 9/2013 | Park | H04N 5/23222 348/218.1 |
| 2013/0254688 A1* | 9/2013 | Shechtman | G06F 3/04845 715/764 |
| 2014/0129990 A1* | 5/2014 | Xin | G06K 9/6201 715/849 |
| 2014/0325439 A1* | 10/2014 | Sohn | G06F 3/04883 715/810 |
| 2014/0354848 A1* | 12/2014 | Kim | H04N 5/23229 348/231.2 |
| 2014/0355974 A1* | 12/2014 | Low | G03B 35/02 396/331 |
| 2015/0293666 A1* | 10/2015 | Lee | G06F 3/04815 715/849 |

* cited by examiner

METHOD AND ELECTRONIC DEVICE FOR SYNTHESIZING IMAGE

CROSS-REFERENCE TO RELATED APPLICATION(S)

This application claims the benefit under 35 U.S.C. §119(a) of a Korean patent application filed on Sep. 2, 2013 in the Korean Intellectual Property Office and assigned Serial number 10-2013-0105161, the entire disclosure of which is hereby incorporated by reference.

TECHNICAL FIELD

The present disclosure relates to a method and electronic device for synthesizing images.

BACKGROUND

A camera for taking pictures is now commonly equipped in most portable electronic devices, such as recently launched smartphones and tablet Personal Computers (PCs). As the various functions of a camera become more important to people, an electronic device having a camera on each of opposite sides is provided.

In general, a camera at the front of the electronic device and a camera at the rear thereof are used for different purposes. For example, the camera at the front of the electronic device is often used for the purpose of taking a self-portrait picture, and the camera at the rear of the electronic device is used for the purpose of taking a picture of an object, landscape, or portrait of someone other than a user. Recently, a technique for simultaneously driving the front and rear cameras to utilize images obtained from them is provided. For example, a user of an electronic device may drive the both front and rear cameras equipped in the electronic device and the electronic device may display two images obtained from the driven front and rear cameras on one screen concurrently.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the abovementioned problems and/or disadvantages and to provide at least the advantages below. Accordingly, an aspect of the present disclosure is to provide a method and device for synthesizing a second image in a first image obtained through a first camera and a second camera equipped at different positions of an electronic device.

Conventionally, two images obtained by using front and rear cameras in an electronic device are displayed on a predetermined fixed area. Accordingly, a method of efficiently displaying two images obtained through front and rear cameras in an electronic device may be required.

Another aspect of the present disclosure is to provide a method and device for determining an object for synthesizing a second image in a first image obtained through a first camera in an electronic device.

Another aspect of the present disclosure is to provide a method and device for displaying a handler mask again when the handler mask is not displayed by synthesizing a second image in a first image in an electronic device.

In accordance with an aspect of the present disclosure, a method of controlling an electronic device is provided. The method includes obtaining a first image and a second image, determining at least one object in the first image, and synthesizing the second image with the determined at least one object.

In accordance with another aspect of the present disclosure, an electronic device is provided. The electronic device includes a touch detection display, and at least one processor configured to obtain a first image and a second image, to determine at least one object in the first image, and to synthesize the second image with the determined at least one object.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will become more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
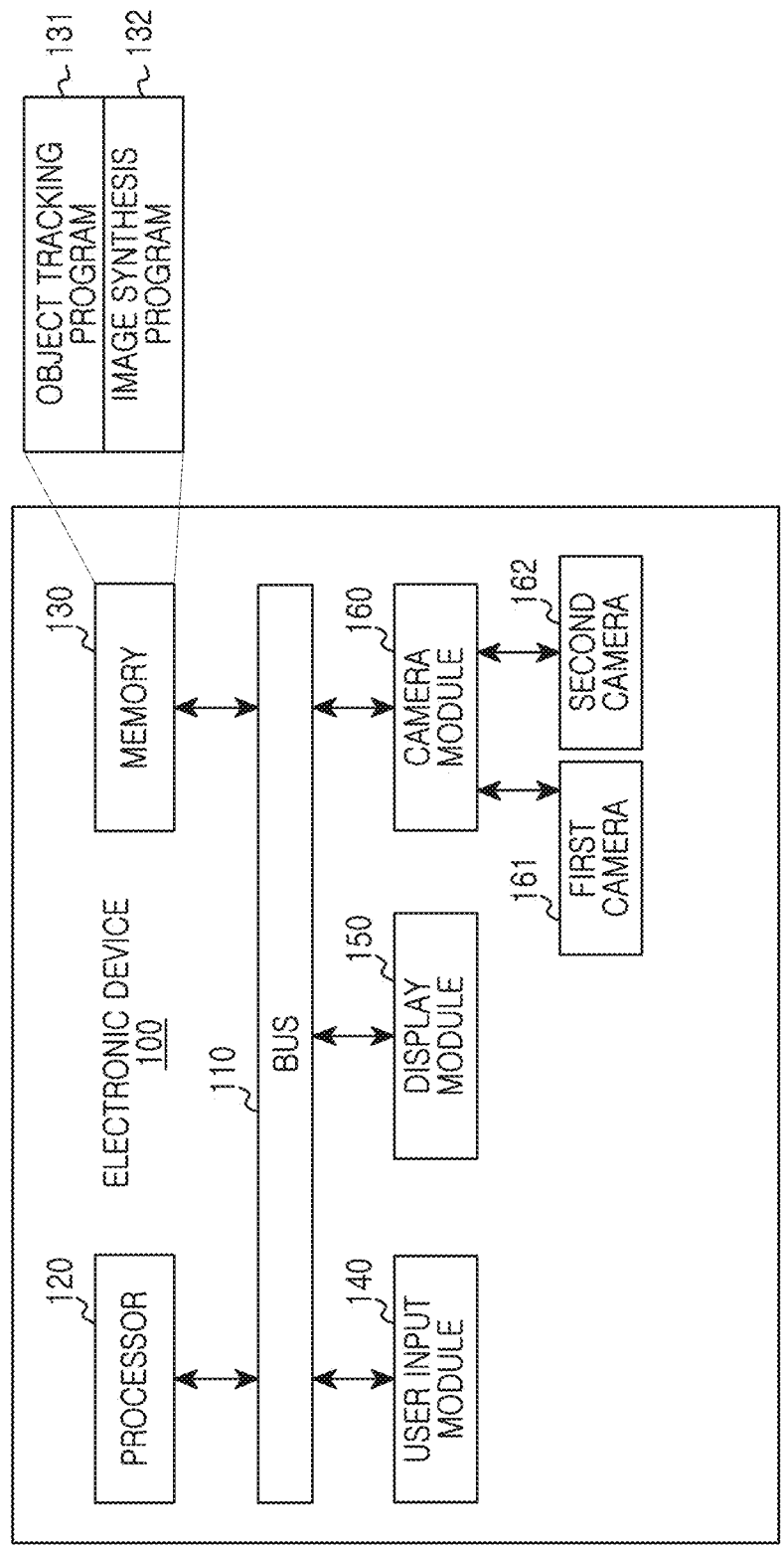
FIG. 1 is a block diagram illustrating a configuration of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, an electronic device may be a device including at least one camera. For example, the electronic device may be a combination including at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Motion Picture Experts Group (MPEG)-2 Audio Layer III (MP3) player, a mobile medical device, a camera, a wearable device, an electronic clock, a wrist device, a refrigerator, an air conditioner, a vacuum cleaner, an artificial intelligence robot, a TV, a Digital Video Disk (DVD) player, an audio system, an oven, a microwave, a washing machine, an air purifier, various medical devices (for example, Magnetic Resonance Angiography (MRA), Magnetic Resonance Imaging (MRI), Computed Tomography (CT), tomography, and ultrasonography), a navigation device, a Global Positioning System (GPS) receiver, an Event Data Recorder (EDR), a Flight Data Recorder (FDR), a set-top box, a TV box (for example, Samsung HomeSync™), an electronic dictionary, a vehicle infotainment device, electronic equipment for a ship (for example, a navigation device for a ship and a gyro compass), avionics, a security device, part of a piece of furniture or a building/structure including an electronic device, an electronic board, an electronic signature receiving device, and a projector. It will be apparent to those skilled in the art that the electronic device is not limited to the above-mentioned devices.

In the description below, an image may include at least one of a still image, a moving image, and a preview image.

FIG. 1 is a block diagram illustrating a configuration of an electronic device according to various embodiments of the present disclosure.

Referring to FIG. 1, the electronic device 100 includes a bus 110, a processor 120, a memory 130, a user input module 140, a display module 150, and a camera module 160. Here, one of the processor 120 and the memory 130 may be provided in plurality.

The bus 110 connects components in the electronic device 100 and controls communication between components in the electronic device 100.

The processor 120 may control the electronic device 100 so that it may provide various services. For example, the processor 120 interprets a command received from at least one other component (for example, the memory 130, the user input module 140, the display module 150, and the camera module 160) in the electronic device 100 through the bus 110 and performs operations and data processing according to the interpreted command.

The processor 120 may control the electronic device 100 thereby providing various services by executing at least one program stored in the memory 130. The processor 120 according to an embodiment of the present disclosure controls an object tracking program 131, thereby tracking at least one object in a first image and determining an object for synthesizing a second image among at least one tracked objects. The processor 120 may control an image synthesis program 132, thereby synthesizing the second image in the determined object in the first image. The synthesis includes rendering and displaying an adjusted second image in an area having an object of a first image on the basis of at least one of the size, shape, and distortion of an object included in the first image.

The memory 130 may store commands or data received or generated from at least one component (for example, the processor 120, the user input module 140, the display module 150, and the camera module 160) included in the electronic device 100. For example, the memory 130 may store output characteristics of a peripheral device connectable to the electronic device 100 and application program information recognized as a virtual device.

The memory 130 stores at least one program for a service of the electronic device 100. For example, the memory 130 may include at least one of the object tracking program 131 and the image synthesis program 132.

The object tracking program 131 may include at least one software component for tracking at least one object area in a first image obtained through the first camera 161 and determining an object for synthesizing a second image in the at least one tracked object.

The object tracking program 131 may track at least one object in the first image by analyzing the first image obtained through the first camera 161 equipped in the electronic device 100. The object tracking program 131 may track at least one object in the first image by analyzing the first image obtained through the first camera 161 equipped in the electronic device 100.

Furthermore, the object tracking program 131 may determine an object for synthesizing the second image from among at least one tracked object. For example, if the second image or the handler mask of the second image approaches within a threshold distance of the tracked object according to a user control, the object tracking program 131 may determine a corresponding object as an object for synthesizing the second image. Here, the handler mask, as an interface for moving and displaying the second image or for adjusting a display size of the second image, may be displayed on a periphery or a border of the second image. As another example, the second image or a handler mask of the second image overlaps at least two tracked objects, the object tracking program 131 confirms an area where the second image or a handler mask of the second image overlaps the tracked object, and determines an object having the largest overlapping area as an object for synthesizing the second image. As another example, when a specific object is selected from among at least one tracked object according to a user control, the object tracking program 131 may determine a corresponding object as an object for synthesizing the second image. As another example, the object tracking program 131 may display a graphic effect emphasizing some objects that satisfy a predetermined condition on the first image among the all tracked objects and may determine an object selected by a user control among the emphasized objects as an object for synthesizing the second image. As another example, when four points on the handler mask match four points of a specific object according to a user control, the object tracking program 131 may determine a corresponding object as an object for synthesizing the second image. If a handler mask for the second image is not provided, the object tracking program 131 may determine an object for synthesizing the second image by matching four arbitrary points of the second image and four points of an object.

The image synthesis program 132 may include at least one software component for synthesizing the second image in the determined object area of the first image on the basis of information on an area of the object determined by the object tracking program 131. In more detail, when an object for synthesizing the second image by the object tracking program 131 is determined, the image synthesis program 132 may synthesize the second image in an area of a corresponding object by adjusting the size and angle of the second image on the basis of information on a corresponding object area.

When the second image is synthesized with the object of the first image, the image synthesis program 132 may not display the handler mask of the second image in order for synthesis without sense of discomfort.

When the second image is synthesized with the object of the first image, the image synthesis program 132 may not display the handler mask of the second image.

Furthermore, while the handler mask of the second image is not displayed, the image synthesis program 132 may display the handler mask again according to input information. For example, when the object area synthesized with the second image is selected or touched by a user, the image synthesis program 132 may display the handler mask of the selected or touched second image again on a periphery or a border of the second image. As another example, when another area (for example, a background area) except for the area of the object synthesized with the second image is selected or touched by a user, the image synthesis program 132 may display the handler mask of the synthesized second image again on a periphery or a border of the second image. As another example, the first image including the object synthesized with the second image is not obtained any more by the object tracking program 131, the image synthesis program 132 may display the second image on the initial display position of the second image or the last display position of the synthesis image, or may display the handler mask on a periphery or a border of the second image. As another example, when a user request for displaying a handler mask displayed on an arbitrary area in the first image is detected, for example, a user request is detected on the basis of a user gesture, a touch operation, a key button, an icon, and a menu, the image synthesis program 132 may display the handler mask of the synthesized second image again on a periphery or a border of the second image.

The user input module 140 may transmit commands or data resulting from a user's selection to the processor 120 through the bus 110. For example, the user input module 140 may include at least one of a keypad including at least one hardware button and a touch panel for detecting touch inputs.

The display module 150 may display images, video, or data to a user. The display module 150 may display an image synthesized with the second image in the first image.

The camera module 160 obtains an image through data inputted from each of the first camera 161 and the second camera 162 and delivers it to the processor 120.

The first camera 161 and the second camera 162 may capture an image of a specific object according to a user control. The first camera 161 and the second camera 162 may be provided at different positions on a device and may be driven simultaneously or at different times according to a user control. For example, the first camera 161 may be a camera disposed at the rear of the electronic device 100, that is, facing away from the user, and the second camera 162 may be a camera disposed at the front of the electronic device 100, that is, facing towards the user.

In the above description, for convenience of description, although it is assumed that two cameras are provided at the electronic device 100, the present disclosure is not limited thereto and may be applied to the electronic device 100 including only one camera. For example, when the electronic device 100 includes only one camera, it may synthesize an image obtained through the camera and an image stored in the electronic device 100 or an image obtained from an external device. In order to obtain an image from an external device, it is assumed that an electronic device includes an additional communication unit for performing a communication with an external device.

Figure 2:
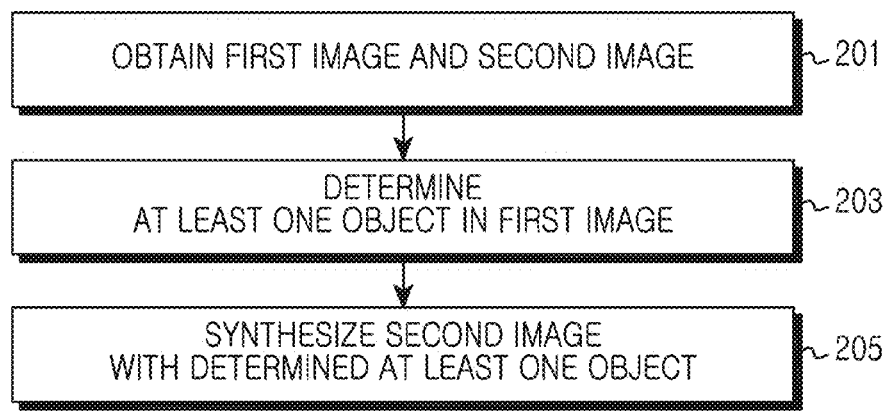
FIG. 2 is a view illustrating a means for synthesizing a second image with a specific object of a first image obtained through a camera in an electronic device according to various embodiments of the present disclosure.

FIG. 2 is a view illustrating synthesizing a second image with a specific object of a first image obtained through a camera in an electronic device according to various embodiments of the present disclosure.

Referring to FIG. 2, the electronic device 100 may perform an operation 201 for obtaining a first image and a second image. The electronic device 100 may include at least one camera for obtaining a first image and a second image. If the electronic device 100 includes two cameras, it may include means for simultaneously driving the first camera 161 and the second camera 162 and means for displaying the first image and the second image obtained through the first camera 161 and the second camera 162 on one screen.

Additionally, the electronic device 100 may perform an operation 203 for determining at least one object within the first image. The electronic device 100 may include a means for tracking an object in a corresponding image by analyzing an image during image acquisition.

Additionally, the electronic device 100 may perform an operation 205 for synthesizing the second image with at least one determined object. Furthermore, as the electronic device 100 or the first camera 161 of the electronic device 100 moves, if information on the shape or size of the determined object is updated, the electronic device 100 may include a means for changing the shape and size of the second image according to the updated information and perform the operation 205 synthesizing the changed second image with the determined object in real time.

Figure 3:
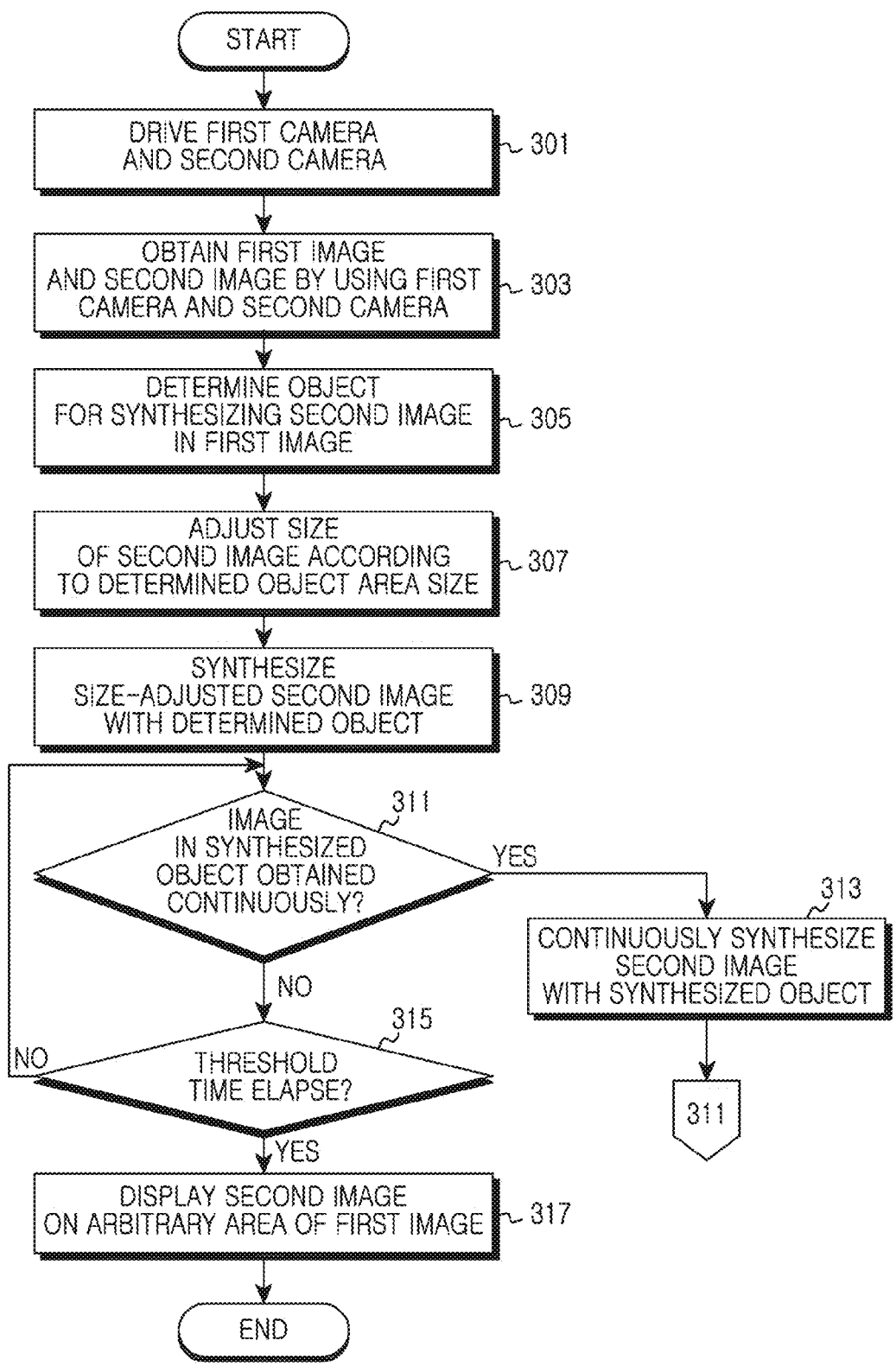
FIG. 3 is a flowchart illustrating a method of synthesizing a second image with a determined object in a first image in an electronic device according to various embodiments of the present disclosure.

FIG. 3 is a flowchart illustrating a method of synthesizing a second image with a tracked object in a first image in an electronic device according to various embodiments of the present disclosure.

Referring to FIG. 3, the electronic device 100 may drive the first camera 161 and the second camera 162 in operation 301. Here, the first camera 161 and the second camera 162 may be provided at different positions of the electronic device 100. For example, the first camera 161 may be a camera disposed at the rear of the electronic device 100 and the second camera 162 may be a camera disposed at the front of the electronic device 100.

The electronic device 100 may obtain a first image and a second image by using the first camera 161 and the second camera 162 in operation 303. Here, the first image refers to an image obtained through the first camera 161 and the second image refers to an image obtained through the second camera 162.

The electronic device 100 may determine an object for synthesizing the second image in the first image in operation 305. In more detail, after tracking at least one object in the obtained first image, the electronic device 100 may determine an object selected according to a user control from among at least one tracked object as an object for synthesizing the second image. A method of determining an object for synthesizing a second image is described based on various embodiments below.

The electronic device 100 may adjust the size of the second image according to the size of the determined object area in operation 307. For example, the electronic device 100 may confirm the size information on an object determined as an object for synthesizing the second image and then may adjust the size of the second image according to the confirmed size information. In addition, the electronic device 100 may confirm the angle or shape information on an area of an object determined as an object for synthesizing the second image and then may adjust the angle or shape of the second image according to the confirmed size information.

The electronic device 100 may synthesize the size-adjusted second image with the determined object in operation 309. The electronic device 100 may synthesize the size and angle-adjusted second image with an object determined as an object for synthesizing the second image among at least one tracked object.

The electronic device 100 may confirm whether an image including an object synthesized with the second image is obtained continuously in operation 311. For example, when the second image is synthesized with a specific object of the first image, the electronic device 100 may confirm whether an object synthesized with the second image is included in the first image that is continuously obtained in real time through the first camera 161.

If an image including a synthesized object is obtained continuously, the electronic device 100 may continuously synthesize the second image with the synthesized object in operation 313. Then, the electronic device 100 returns to operation 311 and performs following operations again.

On the contrary, if an image including a synthesized object is not obtained continuously, the electronic device 100 proceeds to operation 315 and confirms whether a threshold time elapses. The threshold time may be preset during a design operation or may be changed according to a user control.

If the threshold time elapses, the electronic device 100 may proceed to operation 317 and may display the second image on an arbitrary area of the first image.

For example, if the first image including an object synthesized with the second image is no longer obtained, the electronic device 100 may release the synthesis. If the first image including a synthesized object is then not obtained for more than the threshold time, the electronic device 100 may display the second image on an arbitrary area of the obtained first image or an area pre-designated by a user.

For another example, if the first image including an object synthesized with the second image is no longer obtained, the electronic device 100 may release the synthesis of the first image and the second image. If the first image including an object synthesized with the second image is then not obtained for more than the threshold time, the electronic device 100 may display the second image on an arbitrary area of the obtained first image.

As another example, if the first image including an object synthesized with the second image is no longer obtained, the electronic device 100 may release the synthesis of the first image and the second image. When a user input for the first image is detected or a predetermined gesture is detected during a synthesis released state, the electronic device 100 may then display the second image on an arbitrary area of the obtained first image.

According to another embodiment, if the first image including an object synthesized with the second image is no longer obtained, the electronic device 100 may release the synthesis of the first image and the second image. If the first image including an object synthesized with the second image is then not obtained for more than the threshold time, the electronic device 100 may additionally display a user interface for determining a display area of the second image in the first image by a user and may display the second image on an area selected by a user. The user interface for allowing a user to determine a display area of the second image in the first image may select at least one object in object areas included in the first image.

According to another embodiment, if the first image including an object synthesized with the second image is no longer obtained, the electronic device 100 may release the synthesis. If the first image including a synthesized object is then not obtained for more than the threshold time, the electronic device 100 may not display the second image. Then, the electronic device 100 may terminate a procedure according to an embodiment of the present disclosure.

On the contrary, if the threshold time does not elapse, the electronic device 100 returns to operation 311 and performs following operations again. That is, if the first image including an object synthesized with the second image is obtained again before the threshold time elapses, the electronic device 100 returns to operation 311 and performs following operations.

Hereinafter, on the basis of drawings representing various embodiments of the present disclosure, methods of determining an object for synthesizing the second image in the first image and synthesizing the second image with the determined object are described.

Figure 4A:
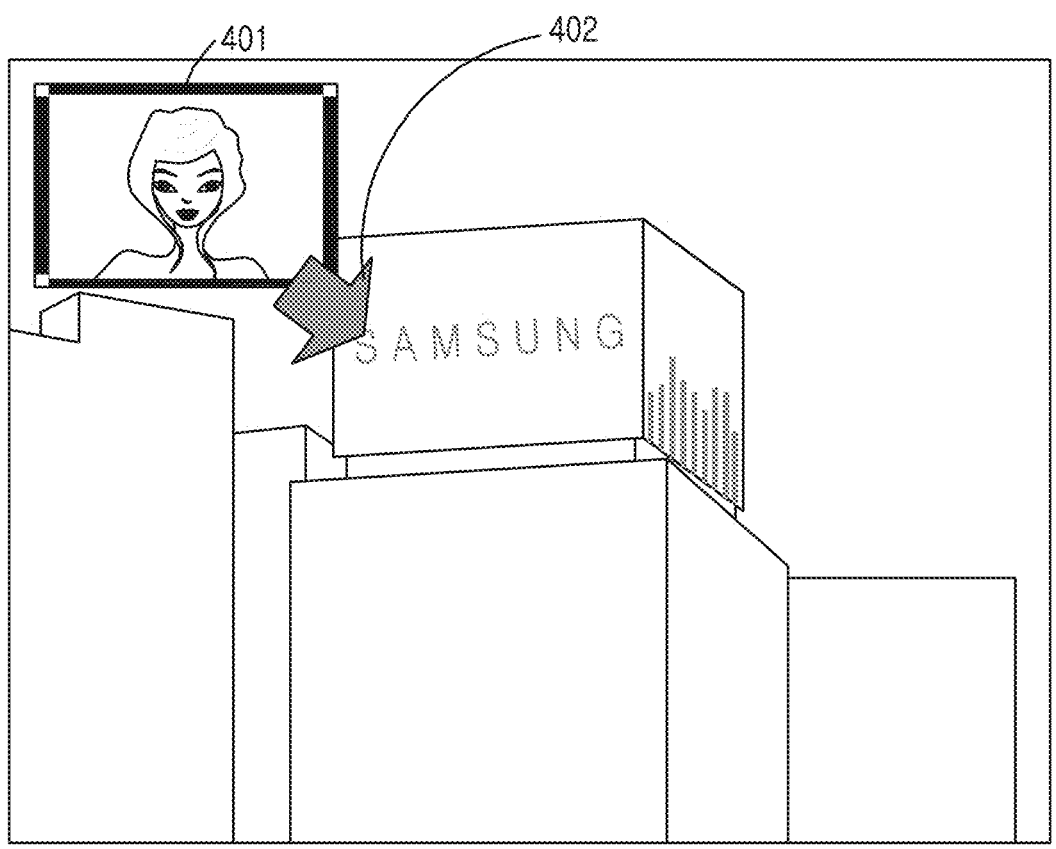
FIGS. 4A, 4B, and 4C are views of controlling a handler mask of a second image and synthesizing the second image in a first image in an electronic device according to various embodiments of the present disclosure.
Figure 4B:
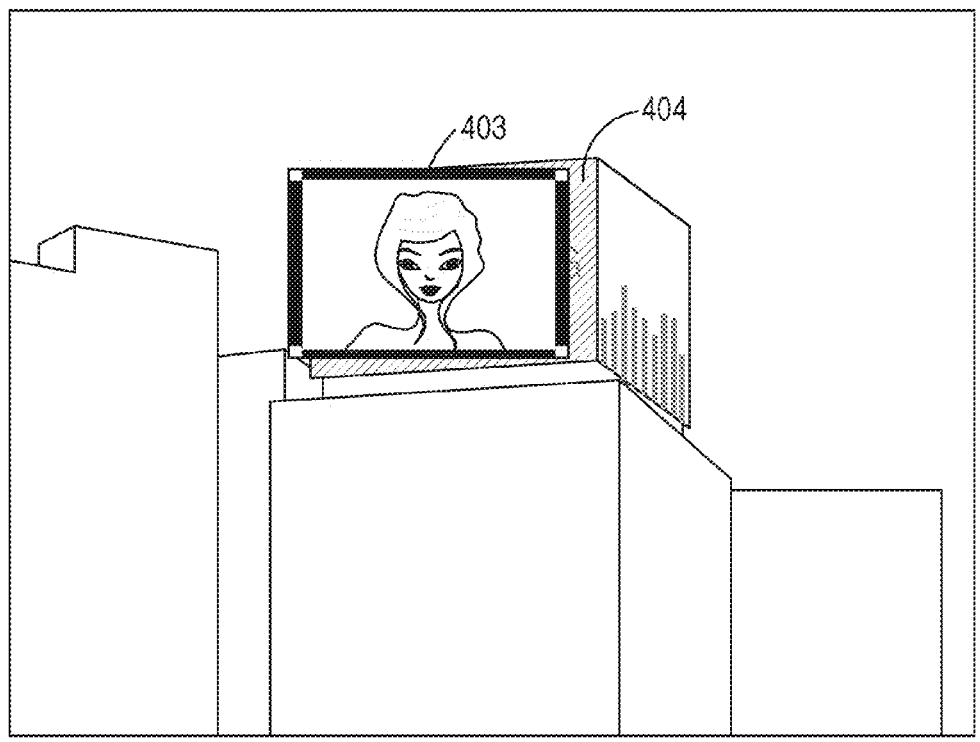
Figure 4C:
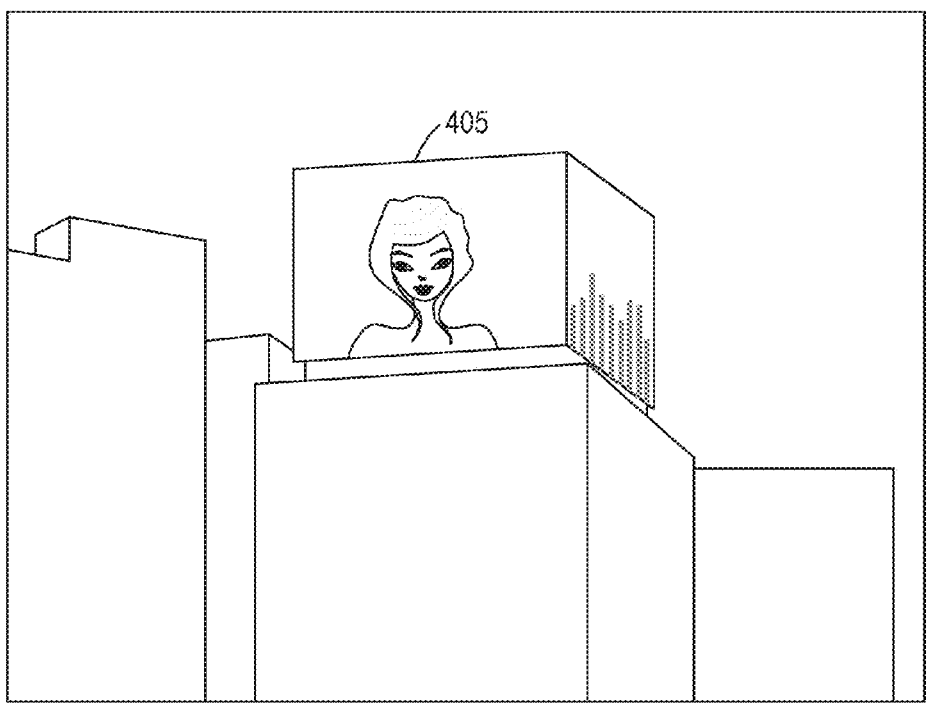

FIGS. 4A to 4C are views of controlling a handler mask of a second image and synthesizing the second image in a first image in an electronic device according to various embodiments of the present disclosure. The electronic device 100, as shown in FIG. 4A, detects an input on the second image 401 displayed in the first image and detects a drag 402 progressing in a specific direction. The electronic device 100 may move the second image according to the detected drag 402.

The electronic device 100, as shown in FIG. 4B, may detect that a drag progressing in a specific direction stops at a specific position and a touch input detected from the second image is released. The electronic device 100 tracks at least one object in the first image and determines an object 404 closest to the position 403 where the second image is moved among tracked objects as an object for synthesizing the second image.

When an object for synthesizing the second image is determined, the electronic device 100, as shown in FIG. 4C, adjusts the second image according to the size and angle of the determined object 404 so as to display a synthesized image 405 synthesized with the second image on a corresponding object 404.

Figure 5A:
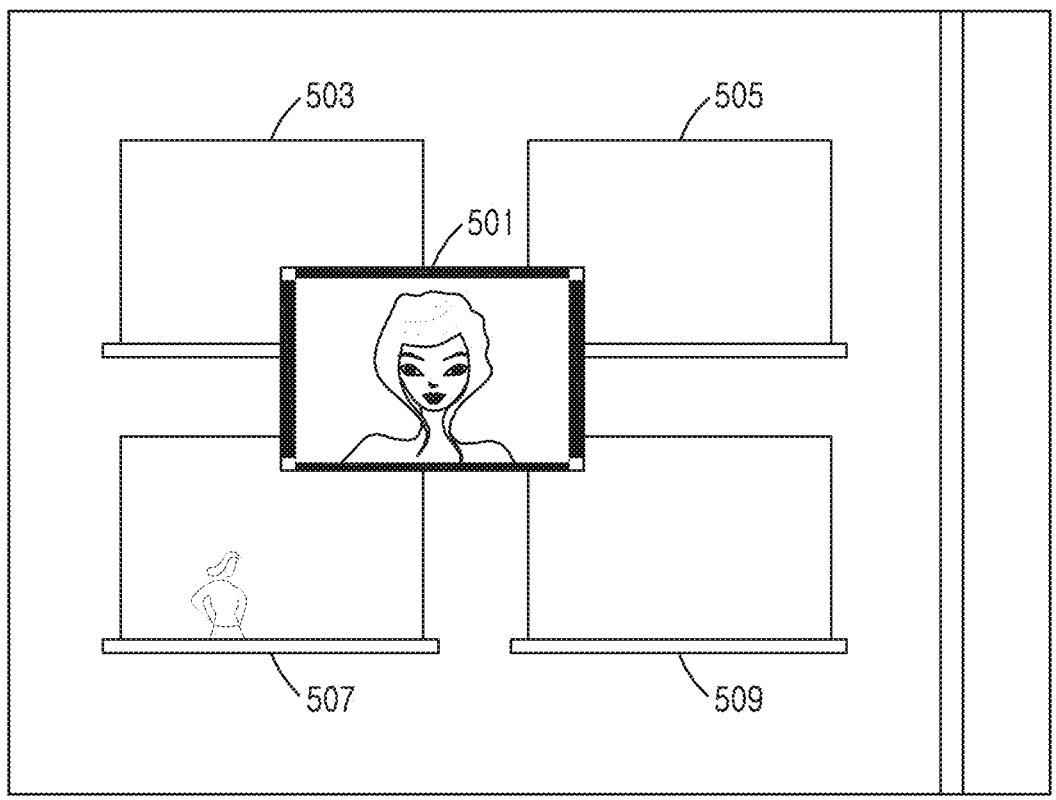
FIGS. 5A and 5B are views of synthesizing a second image according to an area where the second image and an object overlap when there are a plurality of objects in a first image in an electronic device according to various embodiments of the present disclosure.
Figure 5B:
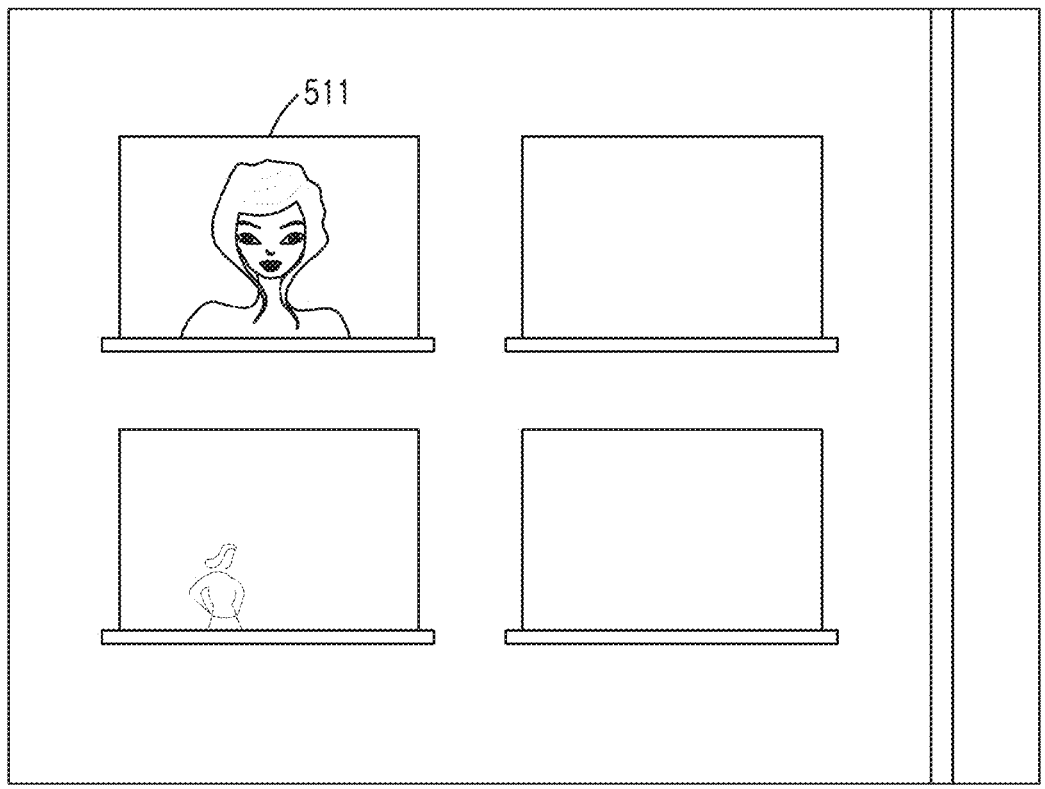

FIGS. 5A and 5B are views of synthesizing a second image according to an area where the second image and an object overlap when there are a plurality of objects in a first image in an electronic device according to various embodiments of the present disclosure.

When the second image 501 overlaps at least two objects 503, 505, 507, and 509 included in the first image, the electronic device 100, as shown in FIG. 5A, confirms an area where the second image 501 overlaps each of the objects 503, 505, 507, and 509 and determines the object 503 having the largest overlapping area as an object for synthesizing the second image 501. When an object for synthesizing the second image is determined, the electronic device 100, as shown in FIG. 5B, adjusts the second image according to the size, angle or shape of the object 503 having the largest overlapping area so as to display a synthesized image 511 synthesized with the second image on a corresponding object.

Figure 6A:
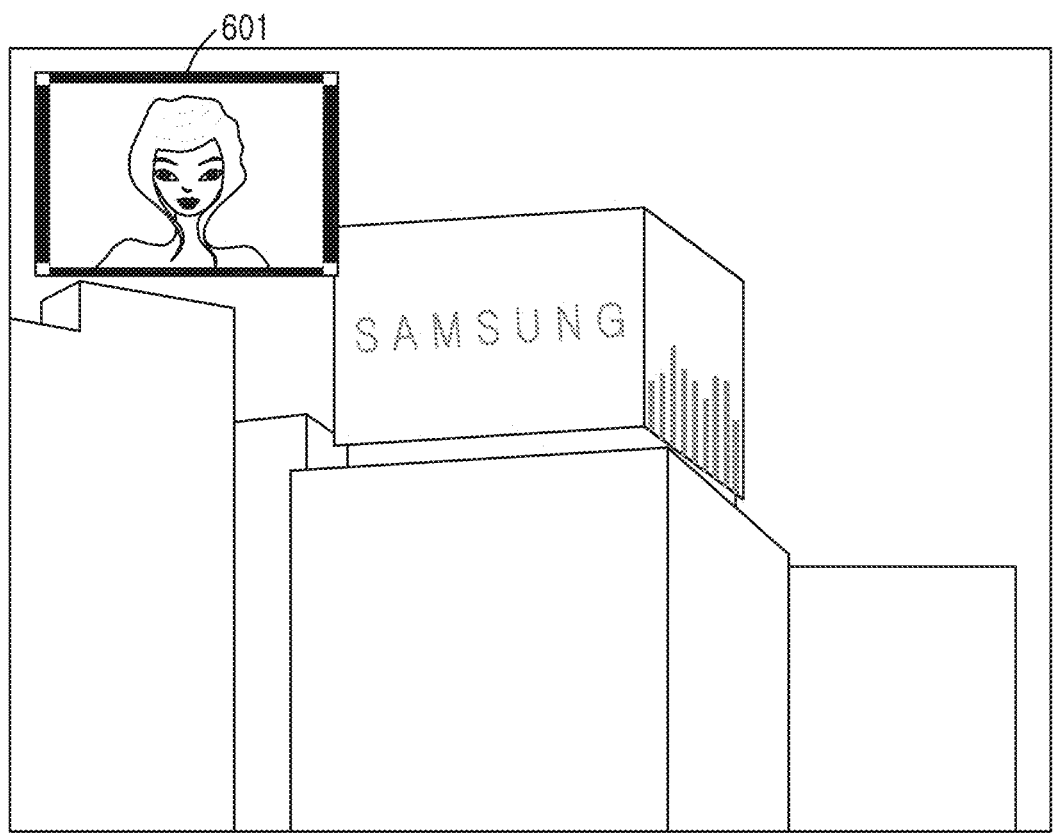
FIGS. 6A, 6B, and 6C are views of synthesizing a second image when a specific object in a first image is selected by a user in an electronic device according to various embodiments of the present disclosure.
Figure 6B:
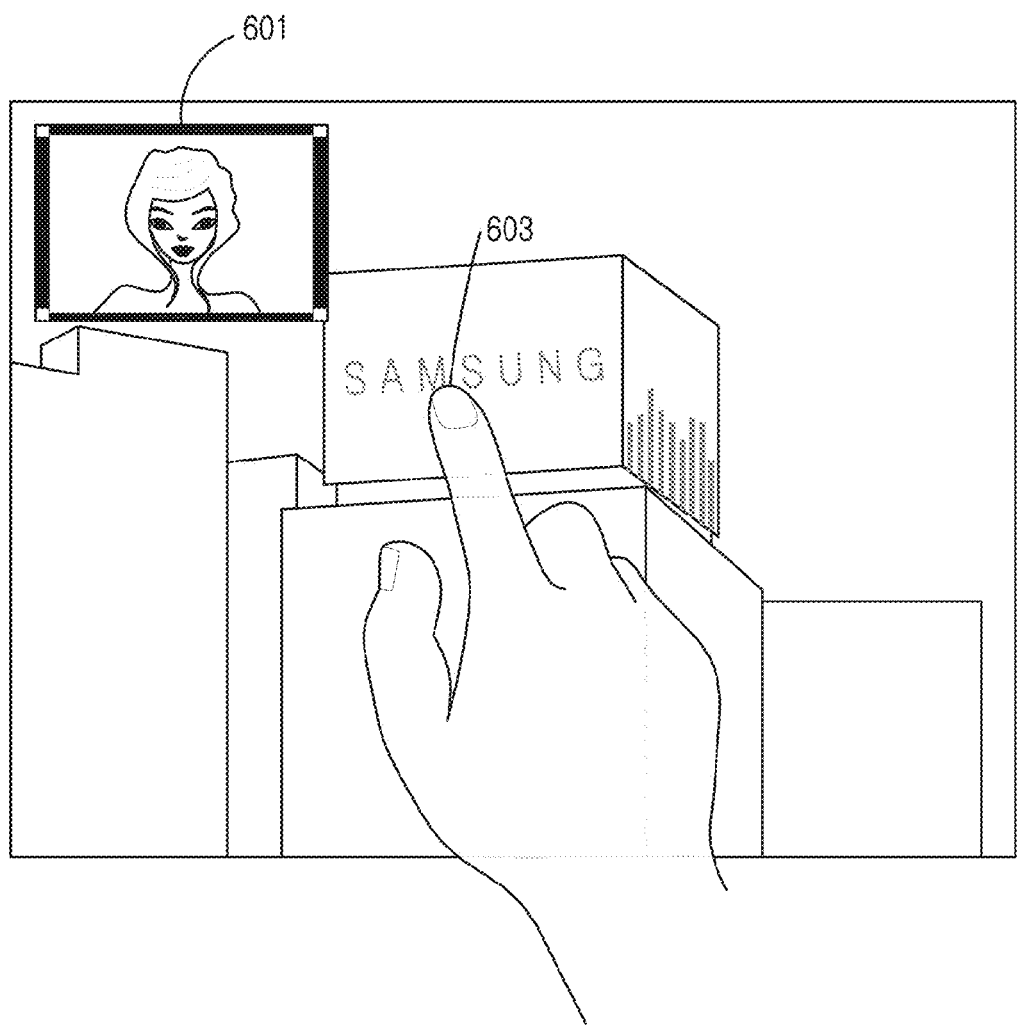
Figure 6C:
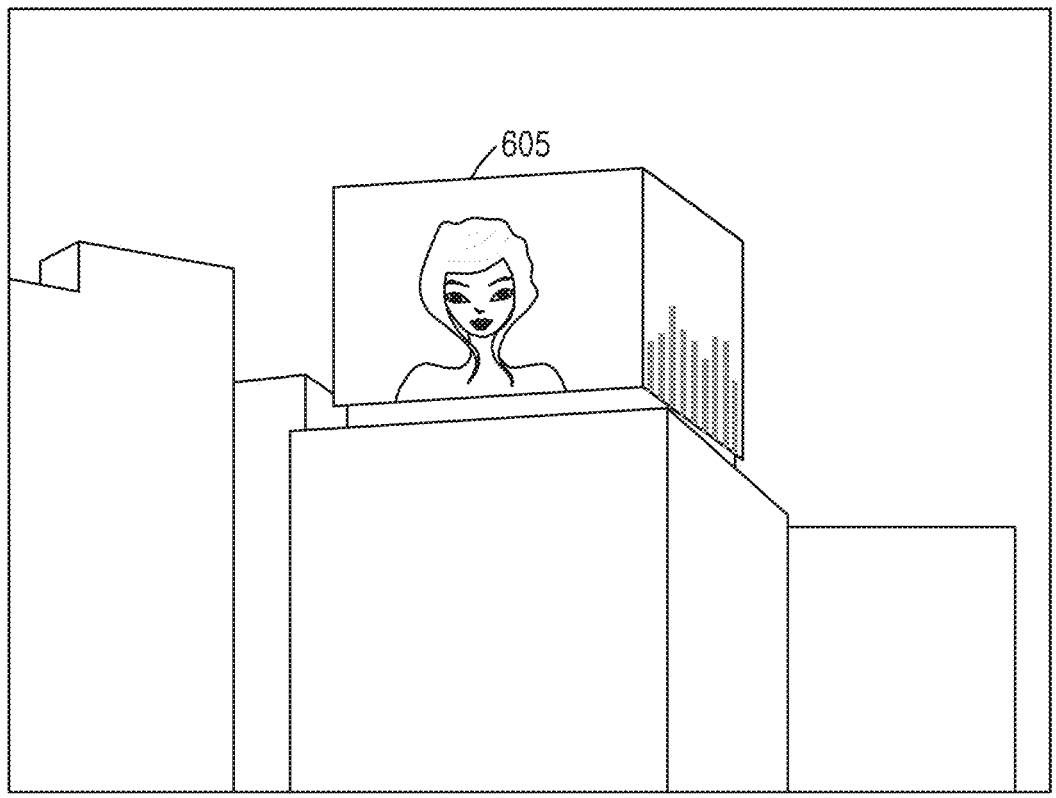

FIGS. 6A to 6C are views of synthesizing a second image when a specific object in a first image is selected by a user in an electronic device according to various embodiments of the present disclosure.

The electronic device 100, as shown in FIG. 6A, may display the second image 601 on an arbitrary area or a predetermined area in the first image.

The electronic device 100, as shown in FIG. 6B, detects a touch on a specific object 603 among at least one object in the first image. The electronic device 100 may determine a touch-detected object 603 as an object for synthesizing the second image. For example, when a double tap on the specific object 603 is detected, the electronic device 100 may determine a double tap-detected object 603 as an object for synthesizing the second image.

When an object for synthesizing the second image is determined, the electronic device 100, as shown in FIG. 6C, adjusts the second image according to the size, angle or shape of the determined object so as to display a synthesized image 605 synthesized with the second image on a corresponding object.

Additionally, when a touch (for example, a tap, a double tap, or a tap of more than a predetermined time) on the synthesized image 605 is detected, the synthesis is released and a handler mask for the second image may be displayed.

Figure 7A:
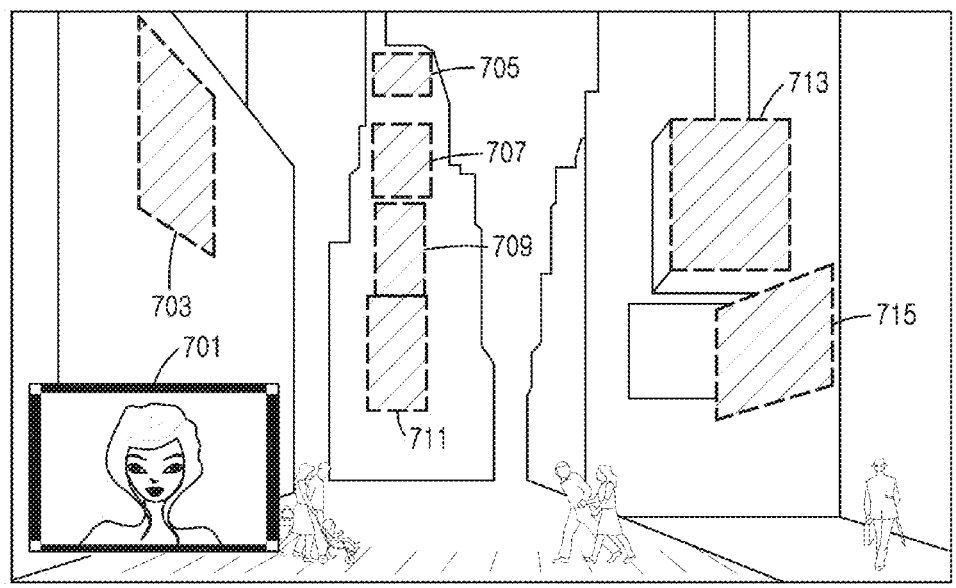
FIGS. 7A, 7B, and 7C are views of synthesizing a second image according to a user selection by providing a synthesizable object in a first image in an electronic device according to various embodiments of the present disclosure.
Figure 7B:
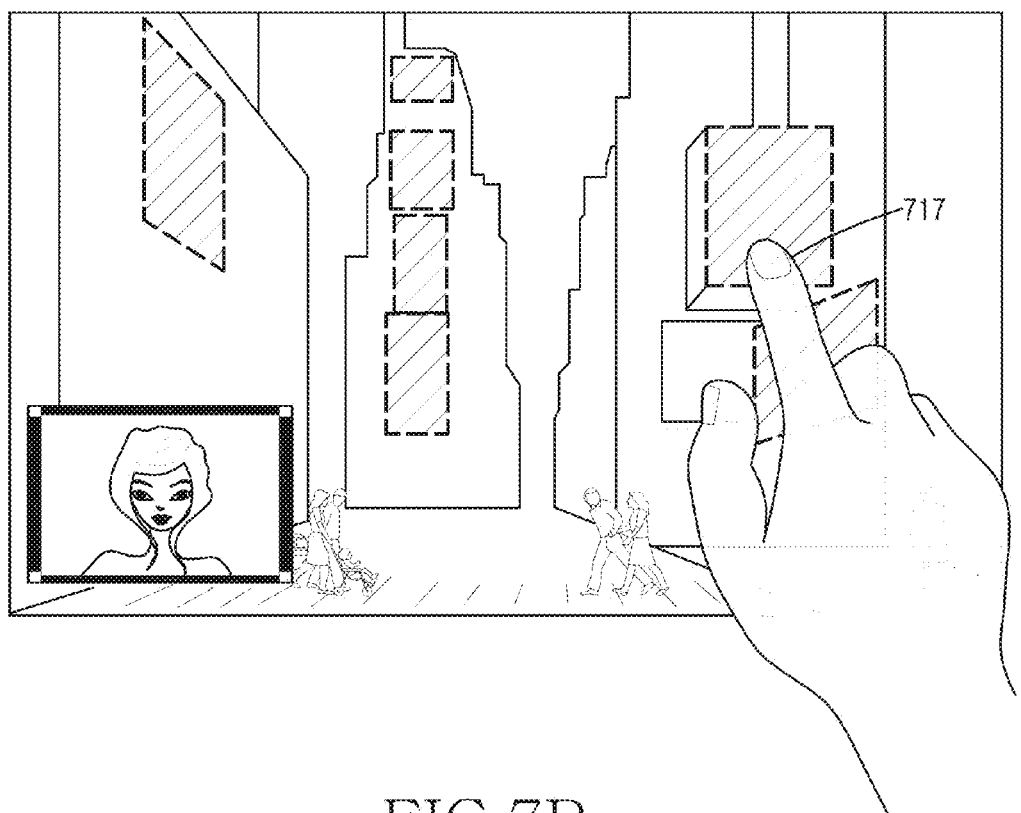
Figure 7C:
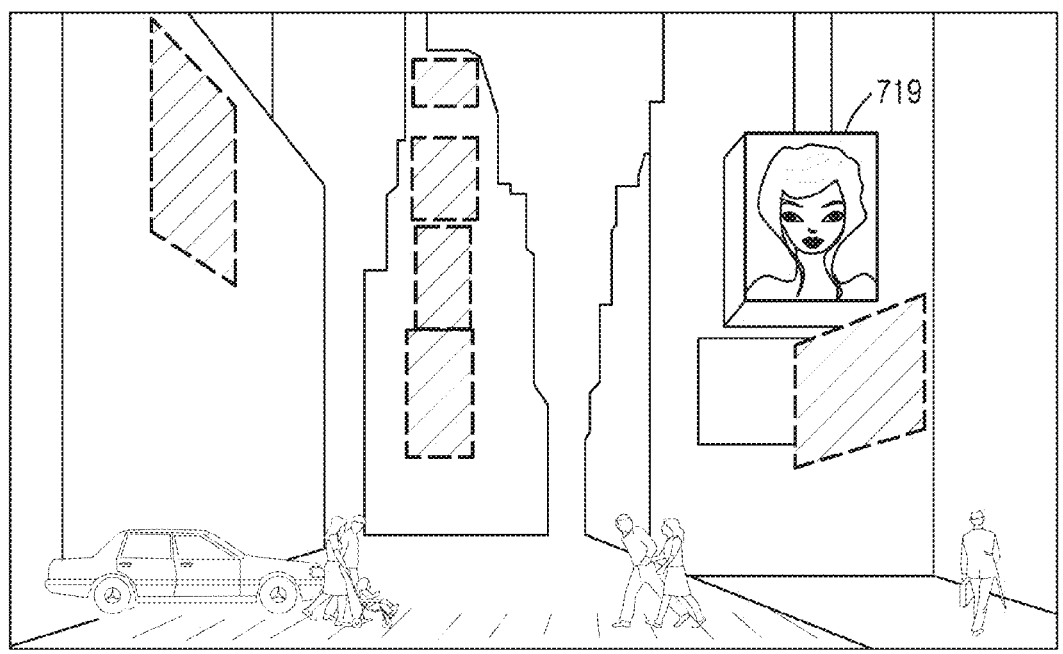

FIGS. 7A to 7C are views of synthesizing a second image according to a user selection by providing a synthesizable object in a first image in an electronic device according to various embodiments of the present disclosure.

The electronic device 100, as shown in FIG. 7A, may display a graphic effect emphasizing objects 703 to 715 that satisfy a predetermined condition among a plurality of objects in the first image while a second image 701 is displayed on an arbitrary area or a predetermined area in the first image. For example, the electronic device 100 may highlight and display (outline thickness change of an object, outline color change of an object, and a circuit or polygonal outline display including an object, and recommendation display for an object) objects having the broadest object areas among a plurality of objects included in the first image.

Referring to FIG. 7B, the electronic device 100 may detect a touch 717 on a specific object among the highlighted objects 703 to 715. The electronic device 100 may determine a touch-detected object 717 as an object for synthesizing the second image. When an object for synthesizing the second image is determined, the electronic device 100, as shown in FIG. 7C, adjusts the second image according to the size, angle or shape of a corresponding object so as to display a synthesized image 719 synthesized with the second image on the corresponding object.

FIGS. 8A to 8D are views of synthesizing a second image by matching four points of a handler mask of a second image to a first image according to a user control in an electronic device according to various embodiments of the present disclosure.

Figure 8A:
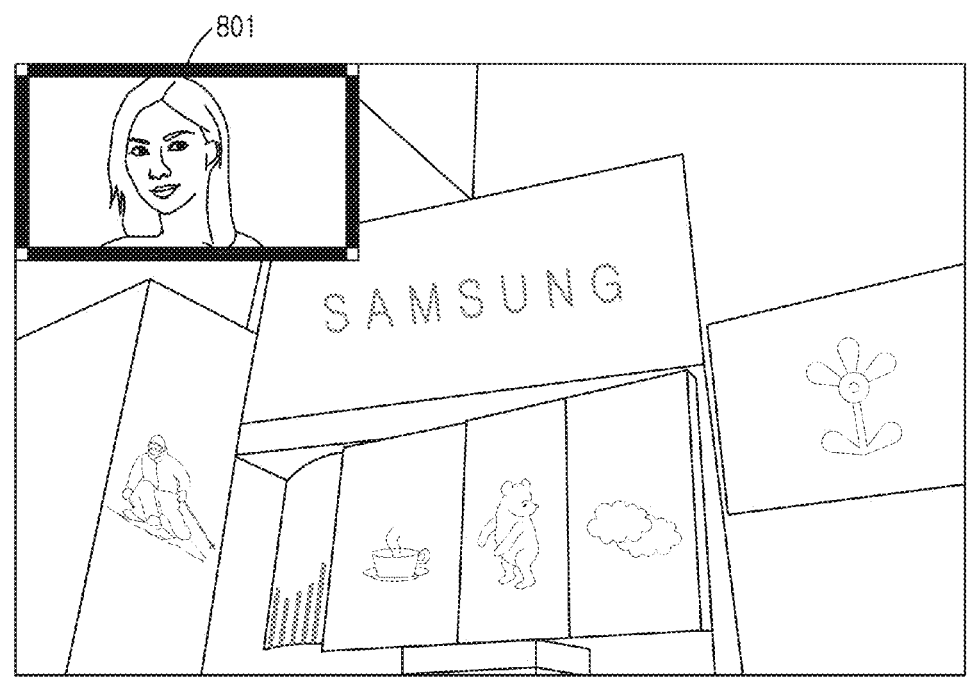
FIGS. 8A, 8B, 8C, and 8D are views of synthesizing a second image by matching four points of a handler mask of a second image to a first image according to a user control in an electronic device according to various embodiments of the present disclosure.
Figure 8B:
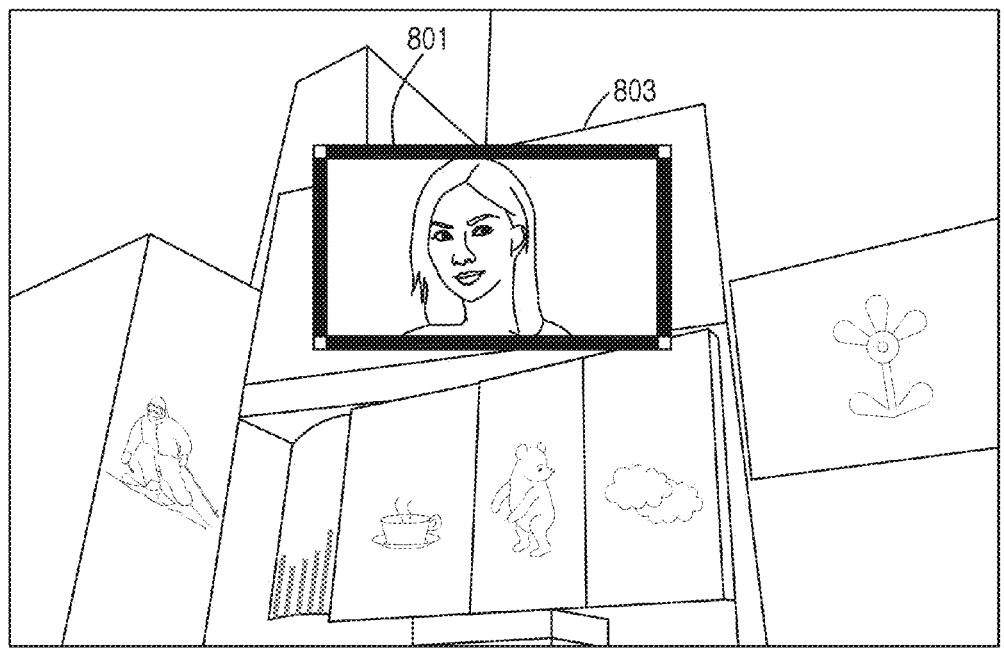
Figure 8C:
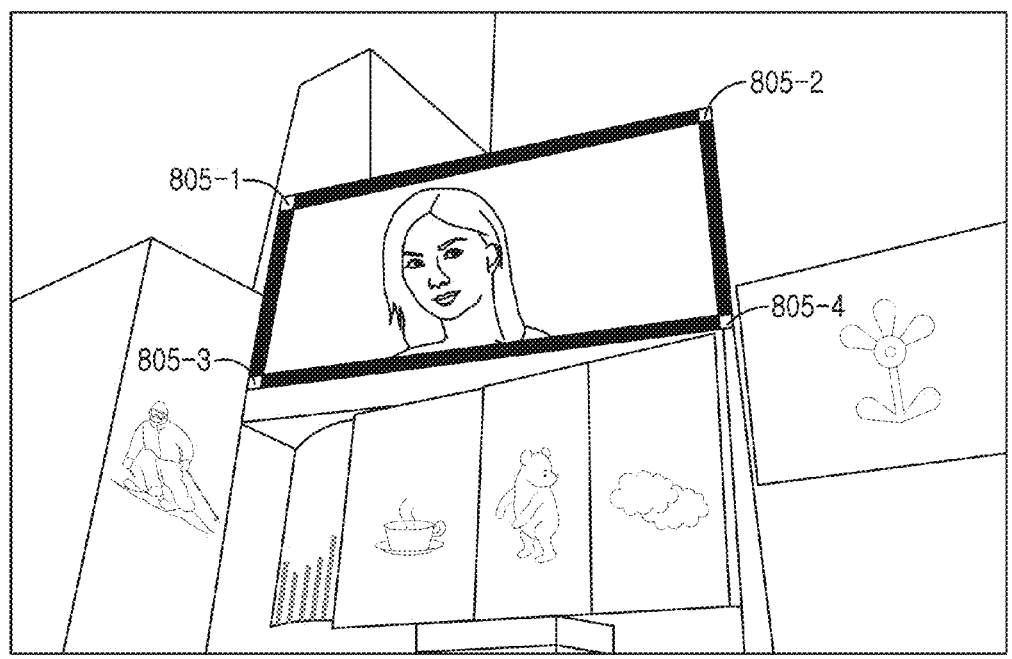

The electronic device 100, as shown in FIG. 8A, may display the second image 801 on an arbitrary area or a predetermined area in the first image. The electronic device 100, as shown in FIG. 8B, may move the displayed second image 801 to another position 803 in the first image according to a user control. After the second image is moved to a specific position, the electronic device 100, as shown in FIG. 8C, may test whether four points 805-1 to 805-4 in a handler mask of the second image are matched to four points of a specific object according to a user control. For example, if a rectangular handler mask is assumed, it is tested whether four vertices of a handler mask are matched to four arbitrary points among a plurality of points configuring a specific object.

Figure 8D:
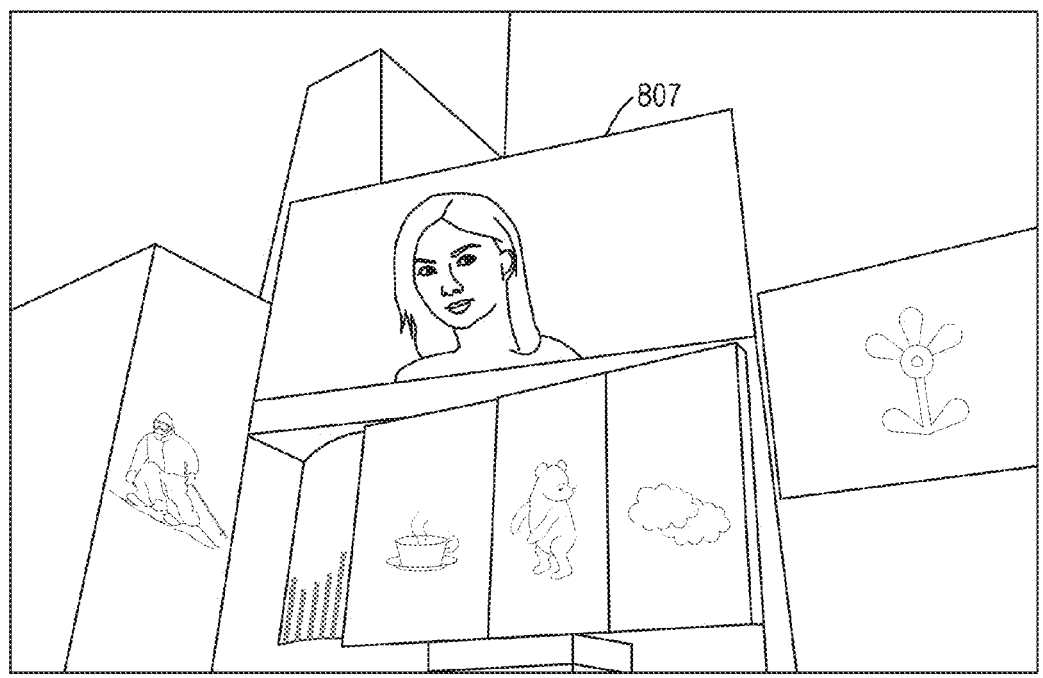

If the four points 805-1 to 805-4 included in the handler mask of the second image are matched to the four points of a specific object according to a user control, the electronic device 100 may determine a corresponding object as an object for synthesizing the second image. When an object for synthesizing the second image is determined, the electronic device 100, as shown in FIG. 8D, adjusts the second image according to the size, angle or shape of a corresponding object so as to display a synthesized image 807 synthesized with the second image on the corresponding object. If the handler mask of the second image does not exist or is not displayed, the electronic device 100 may perform a synthesis by matching four arbitrary points of the second image to four points of an object.

FIGS. 9A to 9E are views of synthesizing a second image when a button for synthesizing the second image in a first image by a user in an electronic device according to various embodiments of the present disclosure.

Figure 9A:
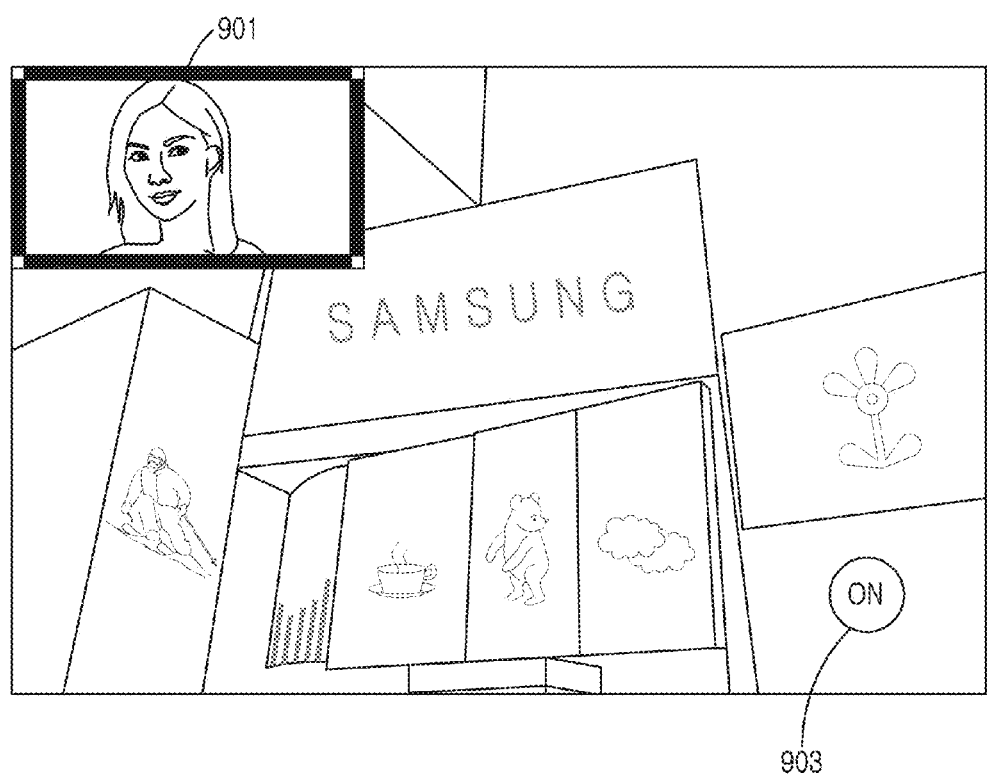
FIGS. 9A, 9B, 9C, 9D, and 9E are views of synthesizing a second image when a button for synthesizing the second image in a first image by a user in an electronic device according to various embodiments of the present disclosure.

The electronic device 100, as shown in FIG. 9A, may display the second image 901 and a button 903 for synthesizing the second image 901 with an object in the first image.

Figure 9B:
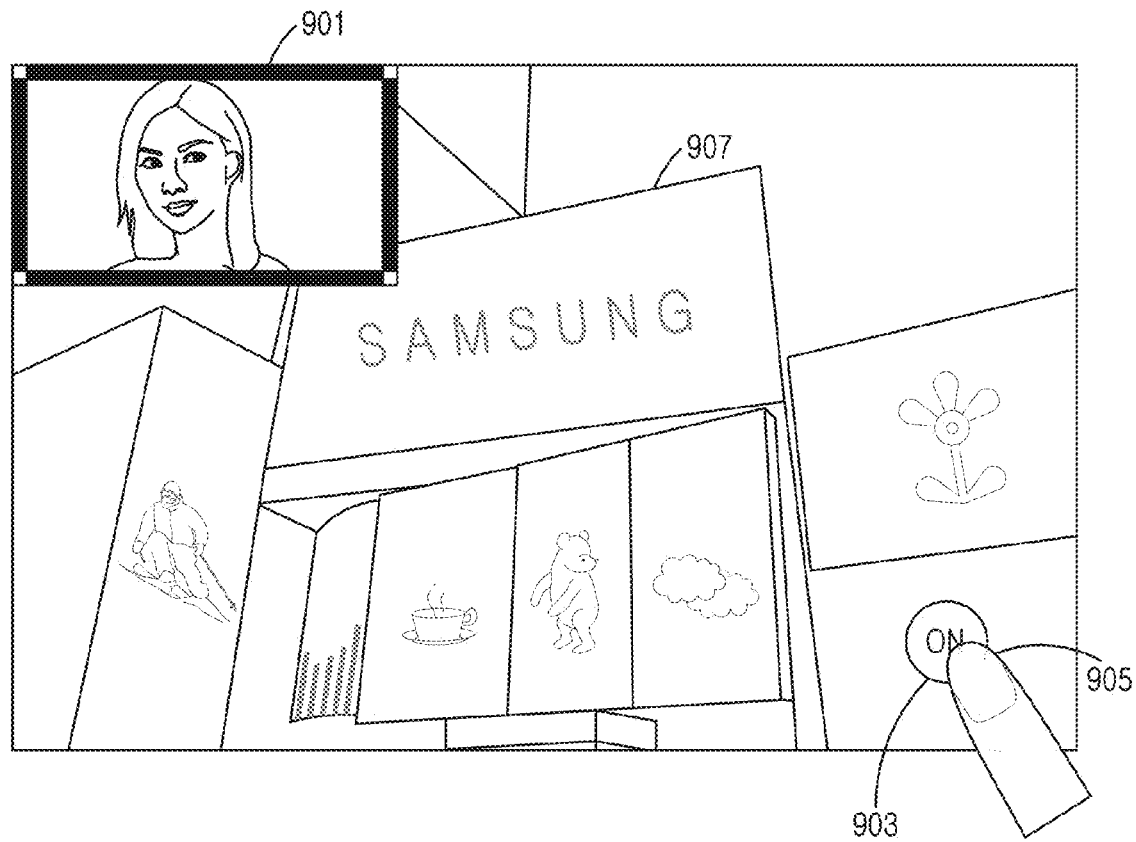

Referring to FIG. 9B, when a touch 905 on the button 903 for synthesizing the second image with an object in the first image is detected, the electronic device 100 may determine an object 907 closest to the position of the second image 901 as an object for synthesizing the second image.

Figure 9C:
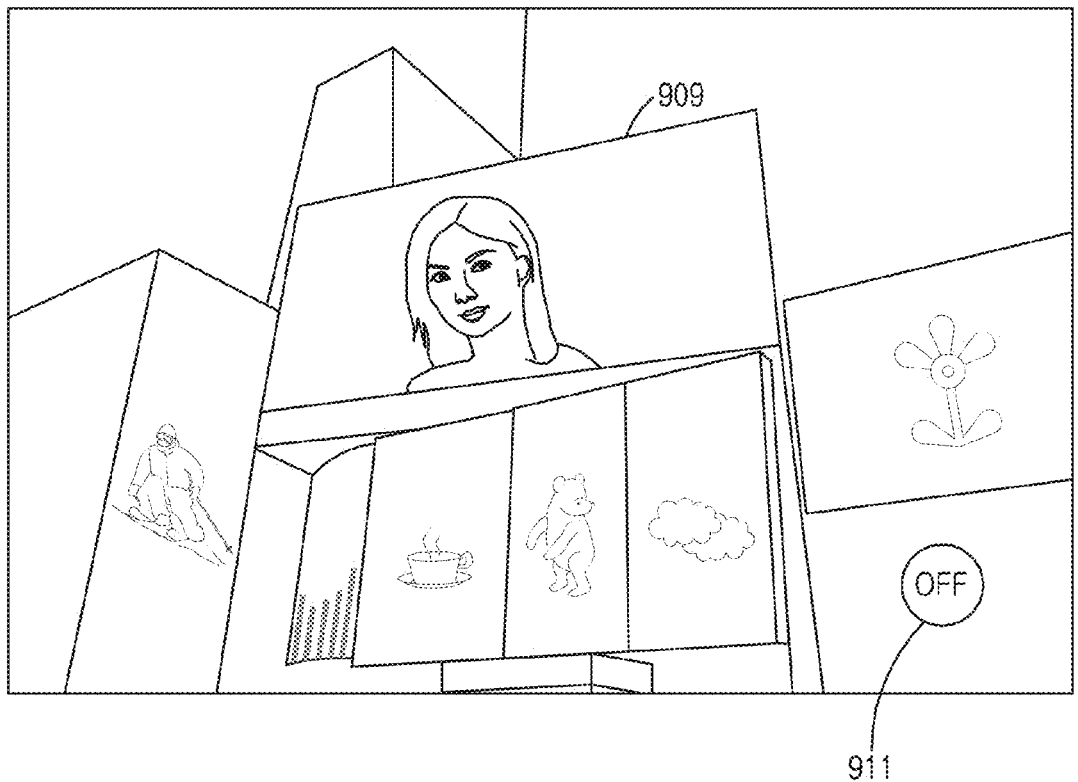

When an object for synthesizing the second image is determined, the electronic device 100, as shown in FIG. 9C, adjusts the second image according to the size, angle or shape of the determined object so as to display a synthesized image 909 synthesized with the second image on a corresponding object. Furthermore, when the second image is synthesized, the electronic device 100 may change the button 903 for synthesizing the second image into a button 911 for releasing the synthesis of an image and then may display the button 911.

Figure 9D:
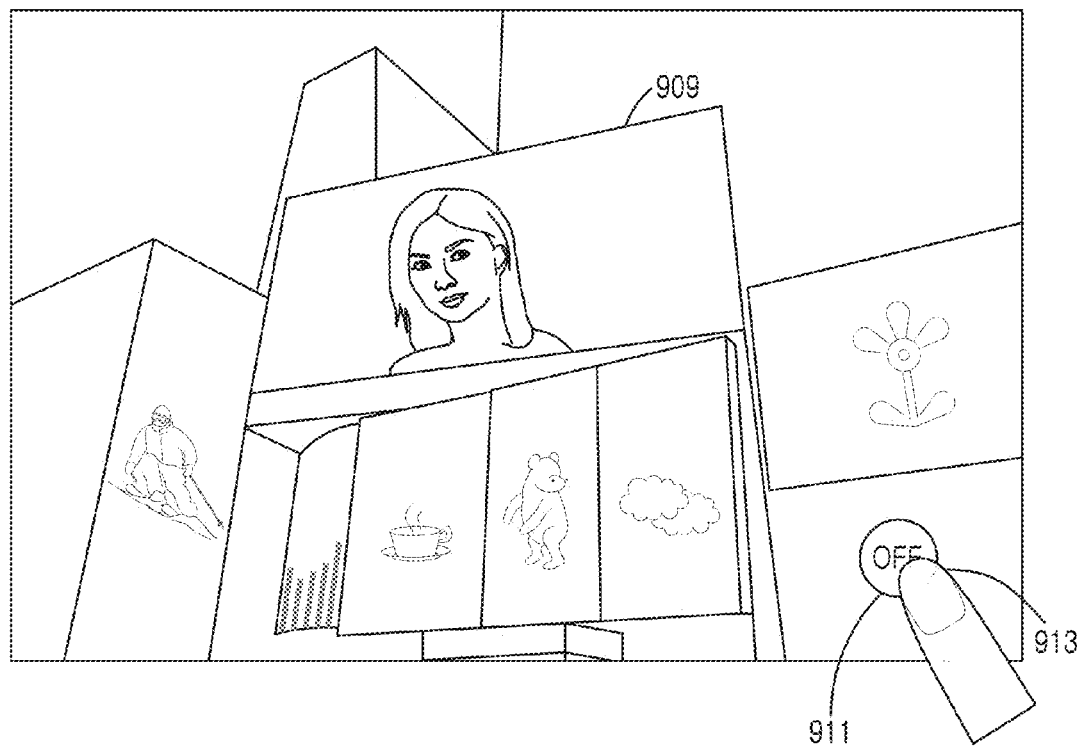
Figure 9E:
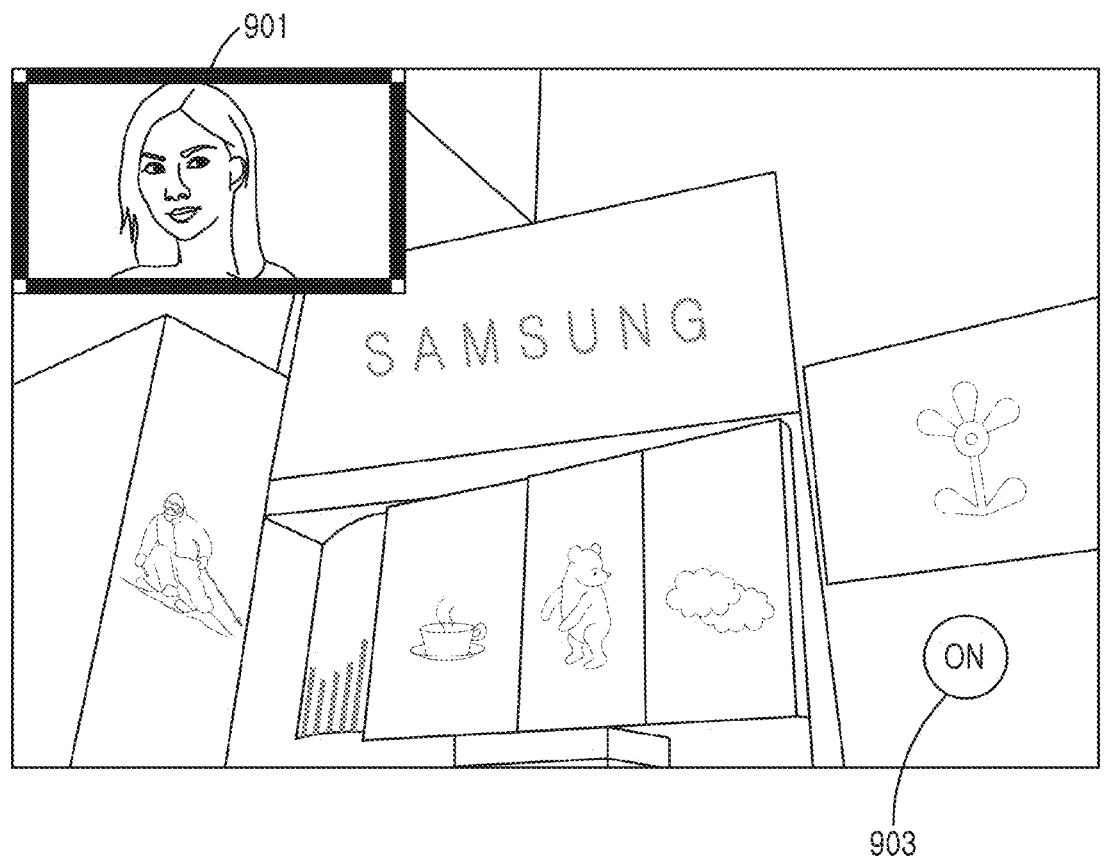

Referring to FIG. 9D, when a touch 913 on the button 911 for releasing the synthesis of an image is detected, the electronic device 100 may release the synthesis of a synthesized image 909 and as shown in FIG. 9E, may display the second image 901 at a position before synthesis. Furthermore, when the synthesis of the synthesized image 909 is released, the electronic device 100 may change the button 911 for releasing the synthesis of the synthesized image back into the button 903 for synthesizing the second image. In the above embodiment, the button 903 for synthesizing an image and the button 911 for releasing the synthesis of an image may be displayed alternately according to whether an image is synthesized or not synthesized.

In addition, the electronic device 100 may display separately a button for synthesizing an image and a button for releasing the synthesis of an image.

Figure 10A:
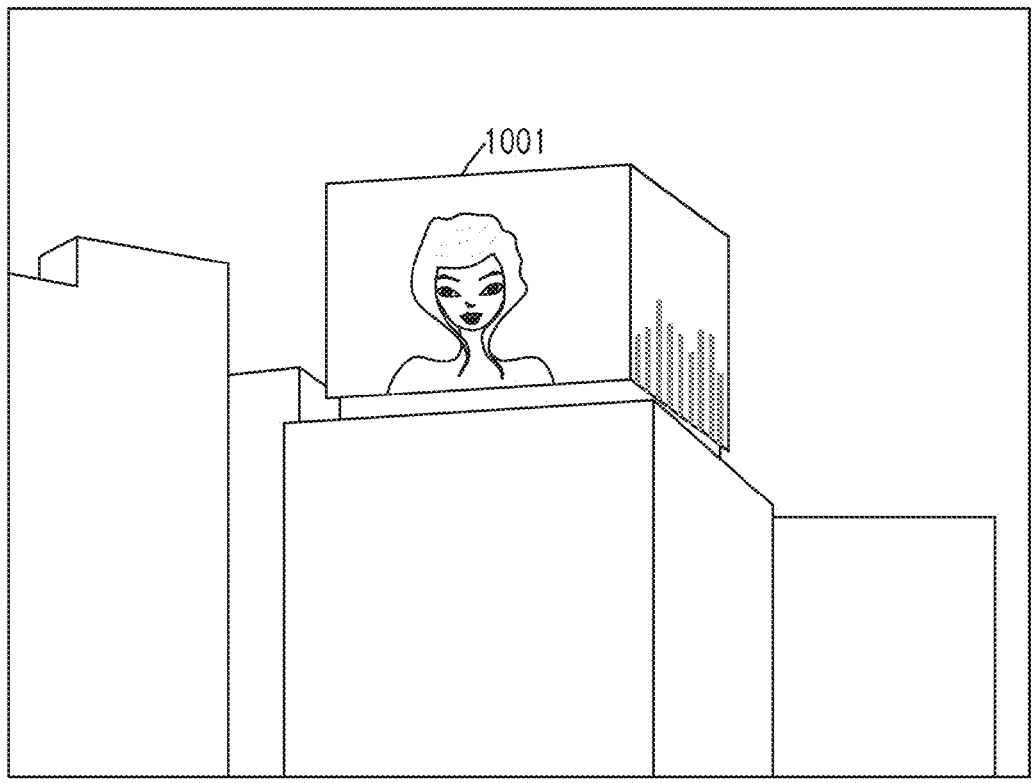
FIGS. 10A and 10B are views of displaying a handler mask of a second image when an image including a synthesized object is not obtained any more in an electronic device according to various embodiments of the present disclosure.
Figure 10B:
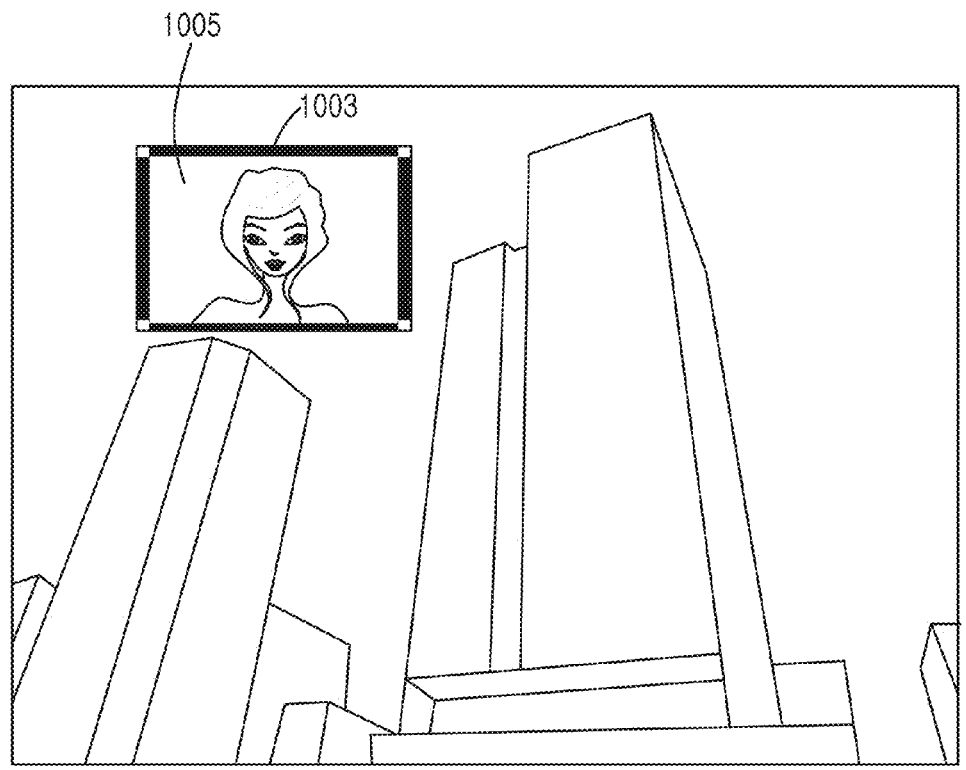

FIGS. 10A and 10B are views of displaying a handler mask of a second image when an image including a synthesized object is no longer obtained in an electronic device according to various embodiments of the present disclosure.

After a synthesized image 1001 is displayed, if the first image including an object synthesized with the second image 1005 is not obtained any more, the electronic device 100 may not display the second image 1005 and if the first image including an object synthesized with the second image 1005 is not obtained for more than the threshold time, the electronic device 100 may display the second image 1005 and a handler mask of the second image 1005 on an arbitrary area 1003 of the first image. Again, the displayed second image 1005 refers to a simple image display instead of a synthesis. For example, after a synthesized image 1001 is displayed, as shown in FIG. 10A, on the electronic device 100, as shown in FIG. 10A, if the first image including a specific object synthesized with the second image 1005 is not obtained for more than a threshold time, the electronic device 100 may display the second image 1005 and the handler mask of the second image 1005 on an arbitrary area 1003 of the first image again.

Referring to FIGS. 1 to 10, when the first image is obtained through the first camera 161 in the electronic device 100, a method of tracking at least one object in the first image, determining an object for synthesizing the second image among at least one tracked object in the first image, and synthesizing the second image is described. However, the situation that there is no trackable object in the first image (for example, there is no object having at least three vertices) may occur.

Figure 11:
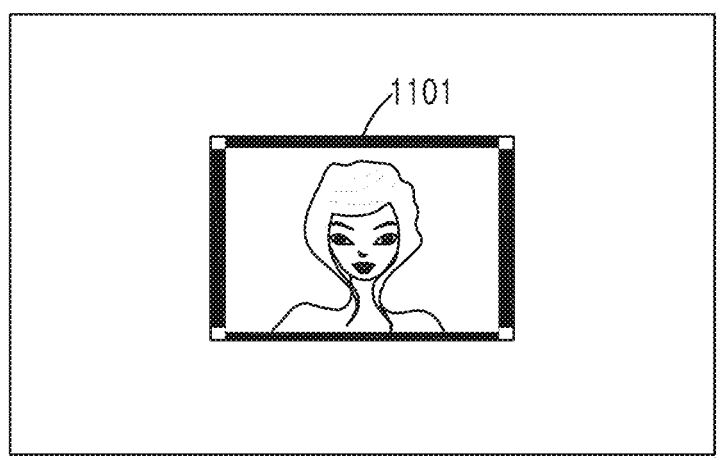
FIG. 11 is a view of displaying a second image at a position where the second image is initially displayed if there is no object to be synthesized in a first image according to various embodiments of the present disclosure.

FIG. 11 is a view of displaying a second image 1101 at a position where the second image 1101 is initially displayed if there is no object to be synthesized in a first image according to an embodiment of the present disclosure.

Referring to FIG. 11, if there is no trackable object in the first image, the electronic device 100 may simply display the second image 1101 on an arbitrary area or a predetermined area in the first image.

In addition, in the above description, a method of performing a synthesis by using a first image and a second image obtained through the first camera 161 and the second camera 162 is described but the present disclosure is not limited thereto. A synthesis may be performed by using an image received from another electronic device or an image stored in the electronic device 100.

The embodiments and all functional operations described in this specification may be implemented using computer software, firmware, hardware, which include structures disclosed in this specification and their equivalent structures, and a combination thereof. Additionally, the embodiments of the present disclosure described in this specification may be implemented using at least one computer program product, that is, a data processing device, or may be implemented using at least one module of computer program instructions encoded on a nontransitory computer readable recording medium for controlling an operation of this device.

The nontransitory computer readable recording medium may be one of a machine readable storage medium, a machine readable storage substrate, a memory device, a configuration of materials affecting a machine readable wave stream, or a combination thereof. The term "data processing device" may include all equipment, devices, and machines for processing data, for example, a programmable processor, a computer, or a multi-processor. In addition to hardware, the devices may include a code for generating an execution environment for a corresponding computer program, for example, a code configuring processor firmware, protocol, stack, database management system, operating system, or a combination thereof.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of synthesizing an image in an electronic device, the method comprising:
   obtaining a first image from a first camera and a second image from a second camera facing an opposite direction of the first camera;
   determining at least one object in the first image as an object for synthesizing with the second image, the at least one object having a plane area distinguished from the second image;
   generating a third image by synthesizing the second image with the determined at least one object;
   determining whether the third image is obtained in predetermined time;
   in response to detecting that the third image is not obtained in the predetermined time, releasing the synthesis of the second image and the at least one object; and
   displaying the first image and the second image on a screen of the electronic device.

2. The method of claim 1, wherein the determining of the object comprises:
   displaying the second image in the first image;
   detecting a movement of the second image by an user input; and
   determining an object closest to a position where the second image is moved as the at least one object for synthesizing with the second image.

3. The method of claim 1, wherein the determining of the object comprises:
   displaying the second image in the first image;
   when the second image overlap at least two objects, confirming an area where the second image and each of the at least two objects overlap; and
   determining an object having a broadest overlapping area with the second image among the at least two objects as the at least one object for synthesizing with the second image.

4. The method of claim 1, wherein the first image and the second image are captured images of opposite directions.

5. The method of claim 4, wherein the first camera and the second camera are driven to operate concurrently.

6. The method of claim 1, wherein the determining of the object comprises:
detecting a touch on a specific object; and
determining the touch-detected object as the at least one object for synthesizing with the second image.

7. The method of claim 6, wherein the touch comprises at least one of a tap, a double tap, and a tap held more than a threshold time.

8. The method of claim 1, wherein the determining of the object comprises:
emphasizing and displaying one or more objects satisfying a predetermined condition;
detecting a touch on a specific object among the emphasized and displayed one or more objects; and
determining the touch-detected object as the at least one object for synthesizing with the second image.

9. The method of claim 1, wherein the determining of the at least one object comprises:
matching a number of arbitrary points of the second image to corresponding arbitrary points of a specific object; and
determining the points matched object as the at least one object for synthesizing with the second image.

10. The method of claim 9, wherein the number of arbitrary points comprise four vertices of a polygon.

11. The method of claim 1, wherein the determining of the at least one object comprises:
detecting a user request for synthesizing the second image; and
determining an object closest to a position of the second image as the at least one object for synthesizing with the second image.

12. The method of claim 11, wherein the user request is detected based on at least one of a user gesture, a touch operation, a key button, an icon, and a menu.

13. The method of claim 1, further comprising:
displaying the second image in the first image; and
displaying a handler mask for controlling a movement and size of the second image on at least one of a border and a periphery of the second image.

14. The method of claim 13, wherein the synthesizing of the second image with the determined at least one object comprises removing the display of the handler mask on the second image.

15. The method of claim 14, further comprising:
detecting a touch on the synthesized image when the display of the handler mask is removed; and
displaying a handler mask on the synthesized image in response to the touch.

16. The method of claim 14, further comprising:
detecting a touch on another area except for an area of the synthesized image area while the display of the handler mask is removed; and
displaying the handler mask of the synthesized image in response to the touch.

17. The method of claim 14, further comprising:
detecting a user request to display the handler mask while the display of the handler mask is removed; and
displaying a handler mask on the synthesized image in response to the user request.

18. The method of claim 17, wherein the user request is detected based on at least one of a user gesture, a touch operation, a key button, an icon, and a menu.

19. An electronic device comprising:
at least two cameras including a first camera and a second camera facing an opposite direction of the first camera;
a display; and
at least one processor configured to:
obtain a first image from the first camera and a second image from the second camera,
determine at least one object in the first image as an object for synthesizing with the second image, the at least one object having a plane area distinguished from the second image,
generate a third image by synthesizing the second image with the determined at least one object,
determine whether the third image is obtained in predetermined time,
in response to detecting that the third image is not obtained in the predetermined time, release the synthesis of the second image and the at least one object, and
display the first image and the second image on a screen of the electronic device.

20. The electronic device of claim 19, wherein the first camera and the second camera are driven to operate concurrently.

21. The electronic device of claim 19, further comprising a memory storing at least one of the first image and the second image,
wherein the processor obtains at least one of the first image and the second image from the memory.

22. The electronic device of claim 19, further comprising a communication unit performing a data communication with another external device, wherein the processor obtains at least one of the first image and the second image from the other external device through the communication unit.

23. A nontransitory computer readable recording medium storing at least one program including instructions for allowing an electronic device to perform the method of claim 1, when executed by the electronic device.

* * * * *